(12) United States Patent
Curtis et al.

(10) Patent No.: US 8,671,931 B2
(45) Date of Patent: Mar. 18, 2014

(54) MULTIPLEXED TORQUE BRAKE SYSTEM FOR A SOLAR CONCENTRATOR ASSEMBLY

(75) Inventors: Gary Noble Curtis, Anacortes, WA (US); Dean Robert Hackbarth, Las Vegas, NV (US); Glenn Alan Reynolds, Long Beach, CA (US)

(73) Assignee: Gossamer Space Frames, Huntington Beach, CA (US)

( * ) Notice: Subject to any disclaimer, the term of this patent is extended or adjusted under 35 U.S.C. 154(b) by 982 days.

(21) Appl. No.: 12/252,328

(22) Filed: Oct. 15, 2008

(65) Prior Publication Data
US 2009/0095283 A1    Apr. 16, 2009

Related U.S. Application Data

(60) Provisional application No. 60/999,075, filed on Oct. 15, 2007.

(51) Int. Cl.
*F24J 2/54*    (2006.01)

(52) U.S. Cl.
USPC ........... 126/704; 126/573; 126/571; 126/690; 126/694

(58) Field of Classification Search
USPC ................. 126/704, 573, 571, 690, 694, 570
See application file for complete search history.

(56) References Cited

U.S. PATENT DOCUMENTS

| | | | | |
|---|---|---|---|---|
| 4,178,913 A | * | 12/1979 | Hutchison | 126/601 |
| 4,249,514 A | * | 2/1981 | Jones | 126/605 |
| 4,306,540 A | * | 12/1981 | Hutchison | 126/607 |
| 4,508,426 A | * | 4/1985 | Hutchison | 359/852 |
| 4,528,977 A | * | 7/1985 | Malley | 126/600 |
| 6,194,651 B1 | | 2/2001 | Stark et al. | |
| 7,011,002 B2 | | 3/2006 | Wirth, Jr. et al. | |

FOREIGN PATENT DOCUMENTS

GB    2 177 495 A    1/1987

OTHER PUBLICATIONS

International Search Report and Written Opinion dated Dec. 16, 2008 for International application No. PCT/US 08/080052, 8 sheets.

* cited by examiner

*Primary Examiner* — Avinash Savani
(74) *Attorney, Agent, or Firm* — Blue Capital Law Firm, P.C.

(57) ABSTRACT

A multiplexed torque brake (MTB) system for preventing the accumulation of torsional forces at a center drive and thereby significantly reducing the design load requirements for trough frames of a corresponding solar concentrator assembly (SCA). In one embodiment, an MTB system for an SCA having a plurality of solar reflector frames spaced along a length of the SCA includes a plurality of brake mechanisms arranged at locations spaced apart from each other along the length of the SCA, each of the brake mechanisms coupled to a corresponding one of a plurality of supporting pylons and configured to constrain the solar reflector frames from rotating when subjected to torsional loads, the brake mechanisms adapted to transfer the torsional loads to the corresponding supporting pylons.

29 Claims, 8 Drawing Sheets

MULTIPLEXED TORQUE BRAKE SYSTEM FOR A SOLAR CONCENTRATOR ASSEMBLY

CROSS-REFERENCE TO RELATED APPLICATION(S)

This application claims priority to and the benefit of U.S. Provisional Application No. 60/999,075, filed on Oct. 15, 2007, the entire content of which is incorporated herein by reference.

FIELD OF THE INVENTION

The present invention relates generally to solar collection facilities, and more particularly to a multiplexed torque brake system for a solar concentrator assembly.

BACKGROUND OF THE INVENTION

Figure 1:
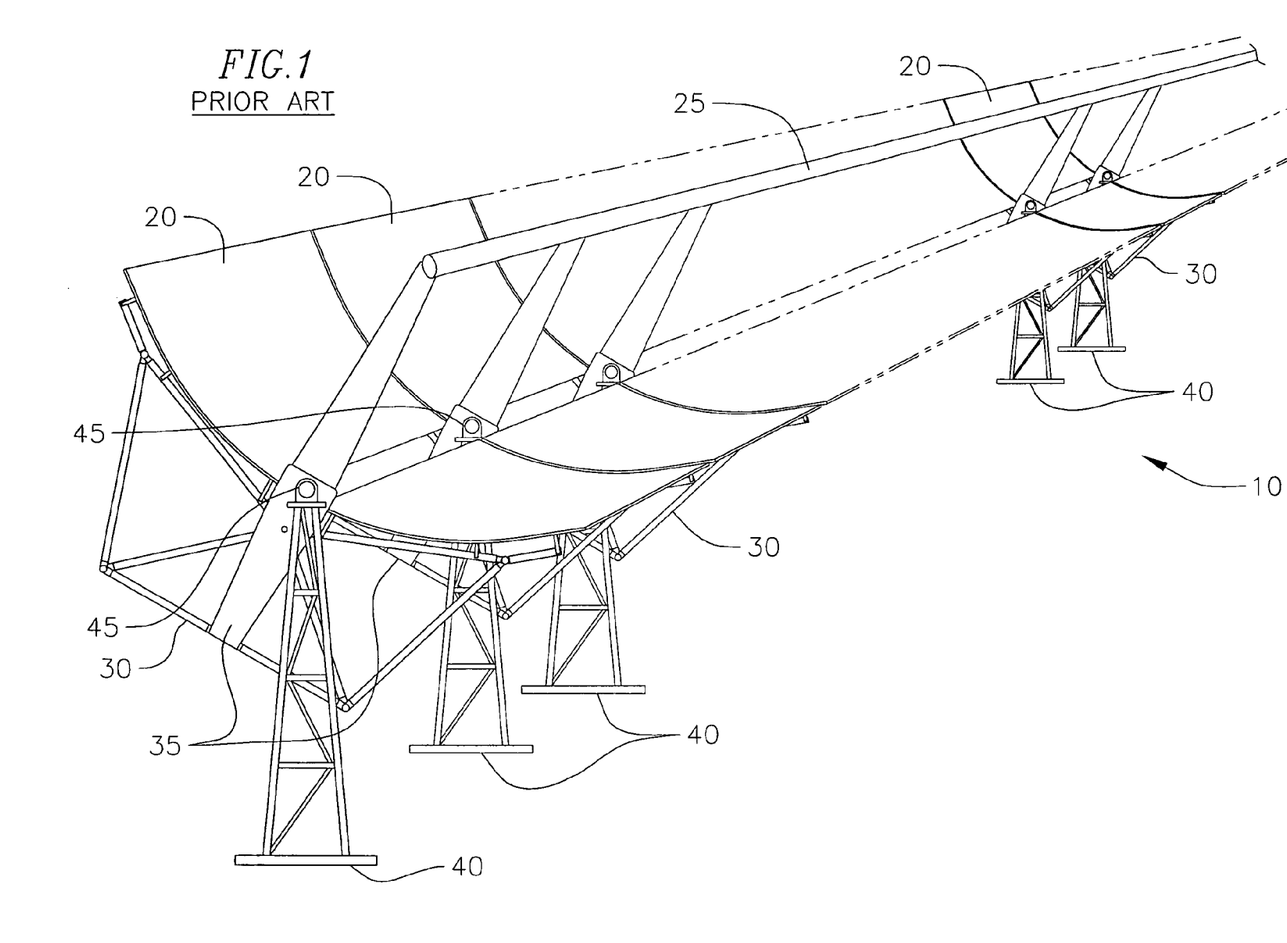
FIG. 1 is a perspective view of a solar concentrator assembly (SCA) according to the prior art.

Solar collection facilities utilize solar concentrators and/or photovoltaic panels for harnessing solar energy. Solar concentrator assemblies (SCAs) utilizing parabolic trough collectors present large reflective surface areas (apertures) for tracking the sun and focusing the captured radiant energy on heat collection elements (HCEs) as a first step in a thermo-mechanical conversion process for generating electrical power. FIG. 1 illustrates a typical SCA 10 according to the prior art, the SCA 10 including a row of parabolic, cylindrically curved, or otherwise curved, troughs 20 for collecting radiant solar energy. The troughs 20 have reflective surfaces for reflecting and focusing the radiant energy on a heat collection tube 25. Each of the troughs 20 is supported by a corresponding trough frame 30, which may be constructed of tubes, bars, extrusions, and/or any other suitable structural members known in the art for supporting and maintaining the critical shape of each of the troughs 20 and the reflective surfaces thereon. Each of the trough frames 30 includes two torque plates 35, one on either side, for coupling to and supporting the trough frames 30 on supporting pylons 40. The torque plates 35, may, for example, be coupled to the supporting pylons 40 at bearings 45. Further, each of the supporting pylons 40 may support one side of each of two adjacent trough frames 30. A solar-trough solar power generation facility typically includes many SCAs, similar to the SCA 10 depicted in FIG. 1, arranged in rows to capture great amounts of solar radiant energy.

Figure 2:
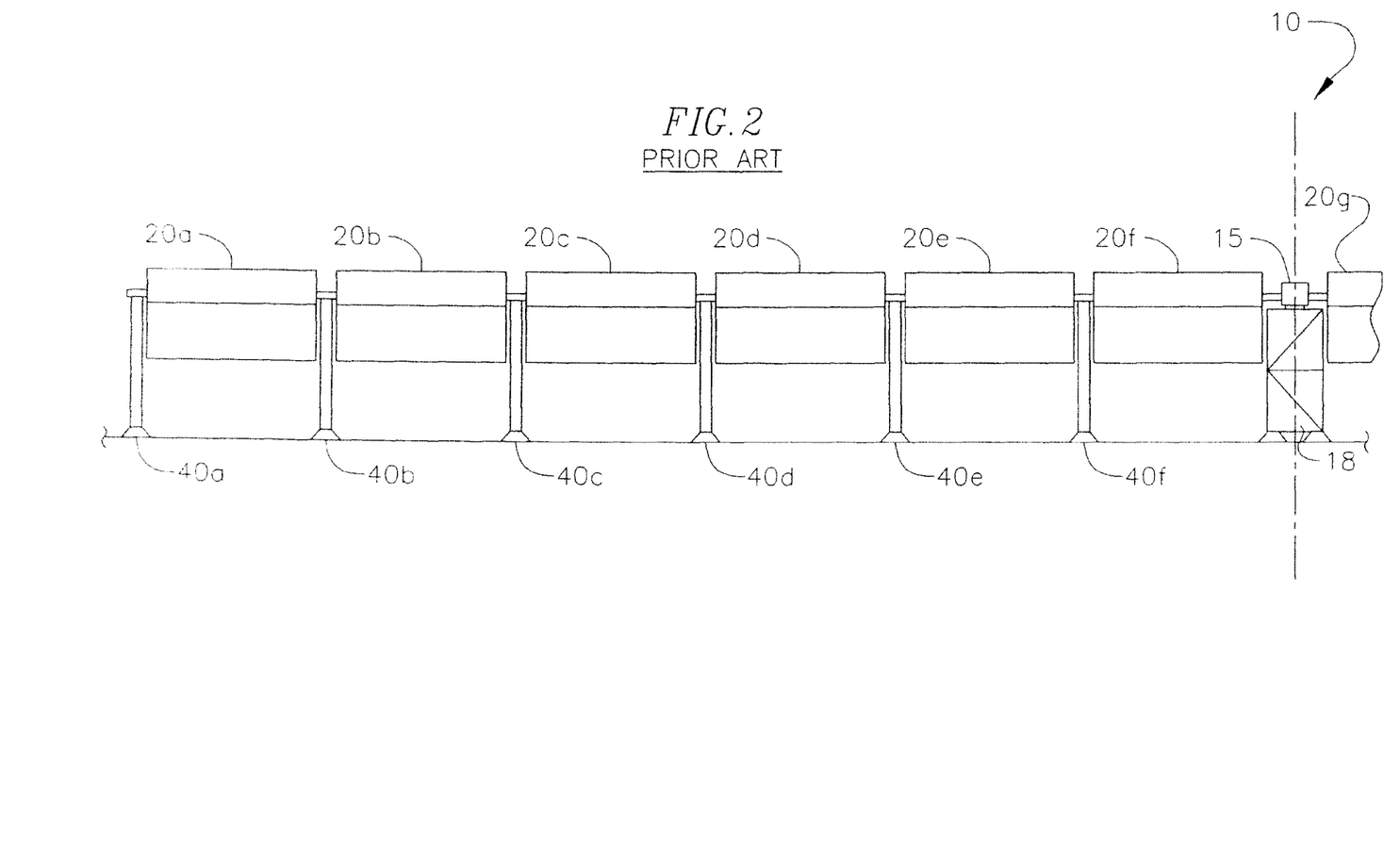
FIG. 2 is a front schematic view of an SCA according to the prior art.
Figure 3:
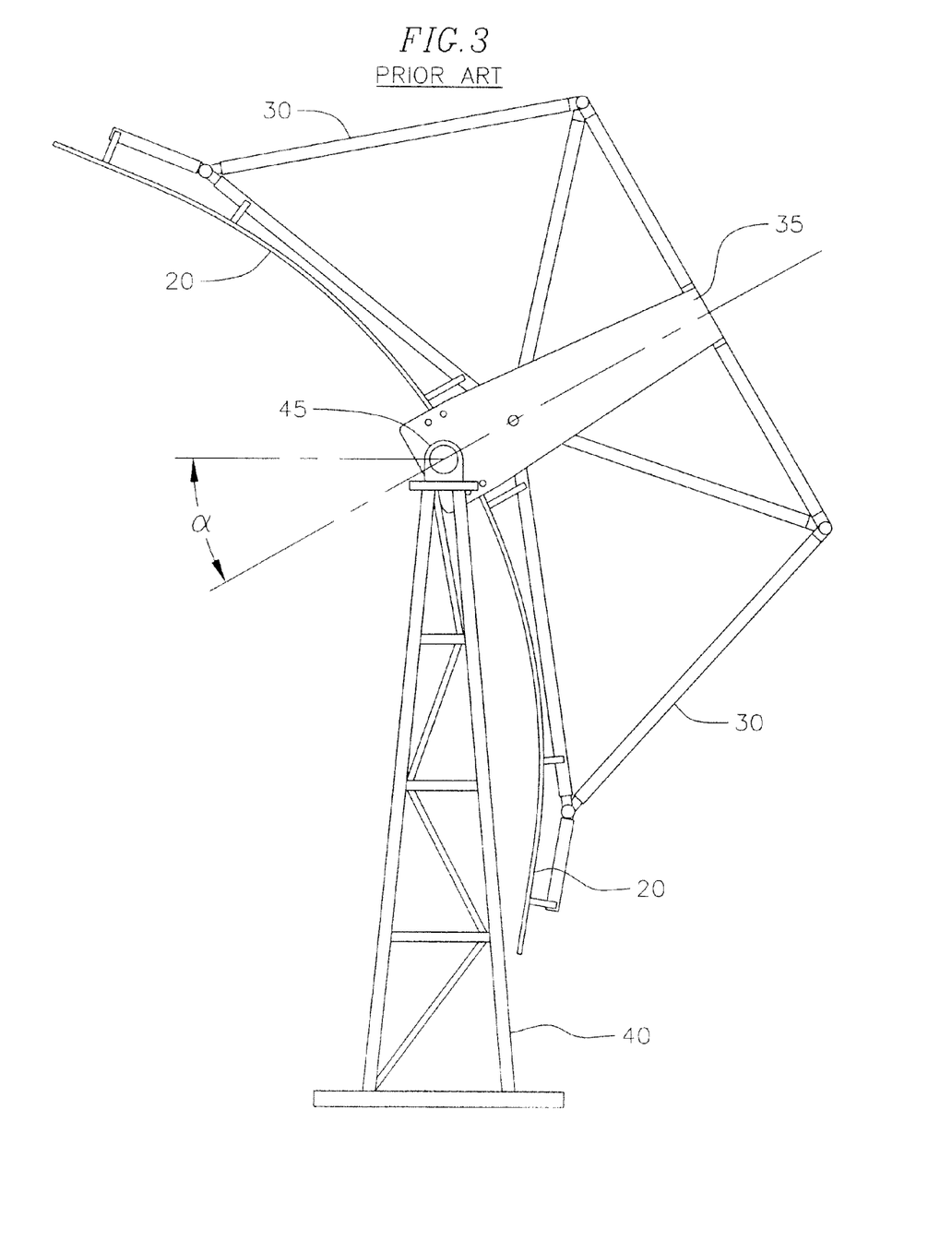
FIG. 3 is a side view of a parabolic trough collector of an SCA according to the prior art, the parabolic trough collector shown in a stowed position.

A typical arrangement for an SCA is to have a row of twelve troughs track the sun utilizing a single-axis center drive unit located at the center of the SCA with six troughs connected continuously on either side. Of course, an SCA may include any other suitable number of troughs. FIG. 2 shows the SCA 10 including a center drive unit ("center drive mechanism" or "torque drive mechanism") 15 mounted on and supported by a central pylon 18, and six trough frames 20a, 20b, 20c, 20d, 20e, 20f in a row on one side of the center drive unit 15 and supported by supporting pylons 40a, 40b, 40c, 40d, 40e, 40f. The SCA 10 also includes six more trough frames in a row on the opposite side of the center drive unit 15, although only the innermost trough frame 20g on the opposite side is partially shown in FIG. 2. The center drive unit 15 drives a rotational movement of the twelve trough frames in unison, and also provides braking via various means. During daylight hours the SCA 10 operates as long as the wind speed does not exceed a certain threshold. Once the maximum operational wind speed is reached, then the troughs 20 are brought to a stowed position for protection (see FIG. 3). As illustrated in FIG. 3, the stowed position of the troughs 20 is defined by a downward facing orientation such that the curved, reflective surfaces are less exposed to the force of the wind. A downward facing angle α with respect to the ground may, in one embodiment, be approximately 30 degrees. Of course, another angle of orientation may be utilized for the stowed position of the troughs 20. To "lock down" the SCA 10 during high winds, a braking mechanism is applied by the center drive unit 15. During lock down, wind loading creates a twisting effect on each trough 20 and associated trough frame 30 that accumulates down the line of troughs from the outermost trough 20a toward the innermost trough 20f and the center drive unit 15. Governing design loads for the trough frames are based on the maximum accumulated twisting (torque) experienced by the innermost frame 20f.

Single, torque brakes (locking solenoids) integral with the center drive mechanism have been used for braking a solar concentrator assembly (SCA), such as for the Nevada Solar One installation. Alternatively, hydraulic ram positioning has been used for SCA braking, such as on the SEG plants in the California Mojave Desert.

Problems develop because wind blowing against the troughs 20 creates twisting of the trough frames 30. Because the SCA 10 includes a number of troughs 20 connected to each other in a row, the outermost trough 20a will experience a first torsional load due to wind forces. This first torsional load is transferred to the second outermost trough 20b because it is connected to the outermost trough 20a through the trough frames 30. Additionally, wind forces apply a second torsional load to the second outermost trough 20b, approximately equal to the first torsional load. Therefore, the second outermost trough 20b is subjected to a combined torsional load approximately twice as great as that applied to the outermost trough 20a. Similarly, along the row of troughs of the SCA 10, each adjacent trough and associated trough frame is subjected to a greater torsional load than an outer adjacent trough and trough frame. Finally, the torsional loads accumulate to critical levels at the innermost troughs 20f, 20g on either side of the center drive unit 15. For example, in the SCA 10 having twelve troughs 20, six on either side of the center drive unit 15, the innermost trough frames 20f, 20g are subjected to a torsional load that is approximately six times greater than the first torsional load on the outermost trough 20a.

Traditionally, the center drive unit 15 has been utilized both to rotate and brake the twelve trough collectors. The torsional loads are critical at survival wind speeds when the center drive unit 15 serves only as a brake. Consequently, all of the trough frames 30 and connected hardware are sized to withstand the maximum torsional load, which is experienced only by the two innermost trough frames 20f, 20g. That is, utilizing the traditional system of braking, either each of the trough frames 30 of the SCA 10 must be designed to withstand the maximum torsional load, which is only applied at the trough frames 30 of the innermost troughs 20f, 20g, or the trough frames 30 must be designed having varying degrees of strength to withstand the varying torsional loads applied to each of the trough frames 30 along the row of troughs. Each of these two possibilities leads to increased cost. Furthermore, requiring the sum of the torques accumulated along the row of trough frames 30 to be borne by the center drive unit 15, as seen in the prior art, necessitates the use of a sturdier, more expensive, and possibly custom-built, center drive unit 15.

SUMMARY OF THE INVENTION

Aspects of embodiments of the present invention are directed toward a multiplexed torque brake (MTB) system for preventing the accumulation of torsional forces at a center drive mechanism, or torque drive mechanism, and thereby significantly reducing the design load requirements for trough frames of a corresponding solar concentrator assembly (SCA). Embodiments of the MTB system maintain the trough frames of the SCA in a stowed position against torsional loads, such as high-wind loads. Embodiments of the MTB system divide the maximum torsional load more evenly among the trough frames, thereby allowing a more economical design for the trough frames. Another aspect of embodiments of the MTB system according to the present invention is the protection provided to the center drive mechanism and the reduction of torsional loads applied to the center drive mechanism, thereby permitting the use of a less expensive, and possibly more standard, center drive mechanism. Yet another aspect of embodiments of the MTB system is a plurality of torque brakes configured to passively engage as soon as the trough frames of the SCA have been rotated to the stowed position, such that the torque brakes engage automatically and remain engaged during a loss of electrical power. Still another aspect of embodiments of the MTB system is an active disengagement device for releasing the torque brakes, such as solenoids, hydraulic cylinders, or motors.

According to one embodiment, in a solar-trough solar power generation facility in which each one of a plurality of curved reflective surfaces is supported by a respective one of a plurality of trough frames connected to one another and rotatable about a common axis of rotation, the trough frames rotatable about the common axis of rotation via a torque drive mechanism, wherein the improvement includes at least one torque brake mechanism operatively associated with at least one of the trough frames, the at least one torque brake mechanism being operable to hold the at least one associated trough frame stationary against torsional loads.

In one embodiment, the trough frames are arranged in sets, and each torque brake mechanism is located centrally of a corresponding one of the trough frame sets. In one embodiment, each trough frame set includes a pair of adjacent trough frames.

In one embodiment, each torque brake mechanism is operable when the trough frames have a selected angular position relative to the common axis of rotation. In one embodiment, the selected angular position of the trough frames defines a position of the trough frames that is protective of the facility.

In one embodiment, the trough frames are coupled to and supported by supporting pylons and connected to one another via torque transfer assemblies.

In one embodiment, each torque brake mechanism comprises an engagement device configured to passively engage an engagement element of a corresponding bearing shaft when the trough frames are rotated to the selected angular position, each of the corresponding bearing shafts being coupled to one of the supporting pylons. In one embodiment, the engagement device of the torque brake mechanism includes a pin or a lug. In one embodiment, the engagement element of the bearing shaft includes an elongated cavity having a cross-sectional shape substantially corresponding to a cross-sectional shape of the engagement device of the torque brake mechanism to prevent or substantially prevent rotation of the bearing shaft when the engagement element of the bearing shaft receives the engagement device of the torque brake mechanism. In one embodiment, the engagement device of the torque brake mechanism is spring-loaded. In one embodiment, the bearing shaft includes a cam, and the engagement element of the bearing shaft is on an outer surface of the cam. In one embodiment, the cam is a stepped or spiraled cam configured to not exert any pressure against the engagement device of the torque brake mechanism when the trough frames are in a collecting position.

In one embodiment, each torque brake mechanism further includes a disengagement device for actively disengaging the engagement device of the torque brake mechanism from the engagement element of the bearing shaft. In one embodiment, the disengagement device of the torque brake mechanism includes a solenoid. In one embodiment, the at least one torque brake mechanism includes a plurality of torque brake mechanisms configured to disengage at the same time in response to an electrical signal.

In one embodiment, each torque brake mechanism is operatively associated with at least one of the torque transfer assemblies at a location corresponding to one of the supporting pylons.

In one embodiment, each torque brake mechanism is electrically coupled to the torque drive mechanism.

In one embodiment, each one of the plurality of curved reflective surfaces is a cylindrically curved reflective surface.

In one embodiment, each torque brake mechanism is operatively associated with the at least one of the trough frames at a location separate from a location of the torque drive mechanism.

In one embodiment, the at least one torque brake mechanism includes a plurality of torque brake mechanisms located and configured to reduce the torsional loads applied to the trough frames while in a stowed angular position to a level less than a greatest torsional load applied at the torque drive mechanism while the trough frames are in a collecting position.

According to another embodiment, the present invention is an MTB system for an SCA having a plurality of solar reflector frames spaced along a length of the SCA, the system comprising a plurality of brake mechanisms arranged at locations spaced apart from each other along the length of the SCA, each of the brake mechanisms coupled to a corresponding one of a plurality of supporting pylons and configured to constrain the solar reflector frames from rotating when subjected to torsional loads, the brake mechanisms adapted to transfer the torsional loads to the corresponding supporting pylons.

According to yet another embodiment, the present invention is a method of maintaining an SCA in a stowed position utilizing a plurality of torque brakes, the method including: positioning the torque brakes at selected locations along a length of the SCA, the locations being selected to minimize a maximum torsional load applied to any one of a plurality of trough frames of the SCA; rotating the trough frames about a common axis of rotation from a collecting position to the stowed position in response to a stowage condition, the common axis of rotation extending along the length of the solar concentrator assembly; engaging the torque brakes after the trough frames have been rotated to the stowed position to constrain the trough frames from rotating about the common axis of rotation; and disengaging the torque brakes in response to a disengagement condition to allow the trough frames to rotate about the common axis of rotation.

In one embodiment, the stowage condition is a measured wind velocity being greater than a predetermined stowage wind velocity.

In one embodiment, the engaging the torque brakes is performed in a passive manner when the trough frames are rotated to the stowed position, and the disengaging the torque brakes is performed in an active manner.

Other features and advantages of the present invention will become apparent from the following detailed description,

DETAILED DESCRIPTION

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive.

The term "torque brake," as used in the preceding summary and the following detailed description and claims of this application, refers to a mechanism which, when operated to act on an associated shaft or other object, is effective to hold the shaft or other object stationary at a given position and to accept, and relieve the shaft or other object from, torque loads applied to the shaft or other object while held at the given position.

The term "cylindrically curved," as used in the preceding summary and the following detailed description and claims of this application, refers to having the shape of a surface traced by a straight line moving parallel to a fixed straight line and intersecting a fixed planar closed curve, or a portion thereof.

As shown in FIGS. 4-10, embodiments of the present invention are directed to a multiplexed torque brake (MTB) system for preventing the accumulation of torsional forces at a center drive mechanism and thereby significantly reducing the design load requirements for trough frames of a corresponding solar concentrator assembly (SCA). Embodiments of the MTB system divide the maximum torsional load more evenly among the trough frames, thereby allowing a more economical design for the trough frames, and also for the center drive mechanism. Embodiments of the MTB system include one or more torque brake mechanisms spaced apart from each other along a length of an SCA at locations, at locations other than, or in addition to, a location of a center drive mechanism.

Figure 4:
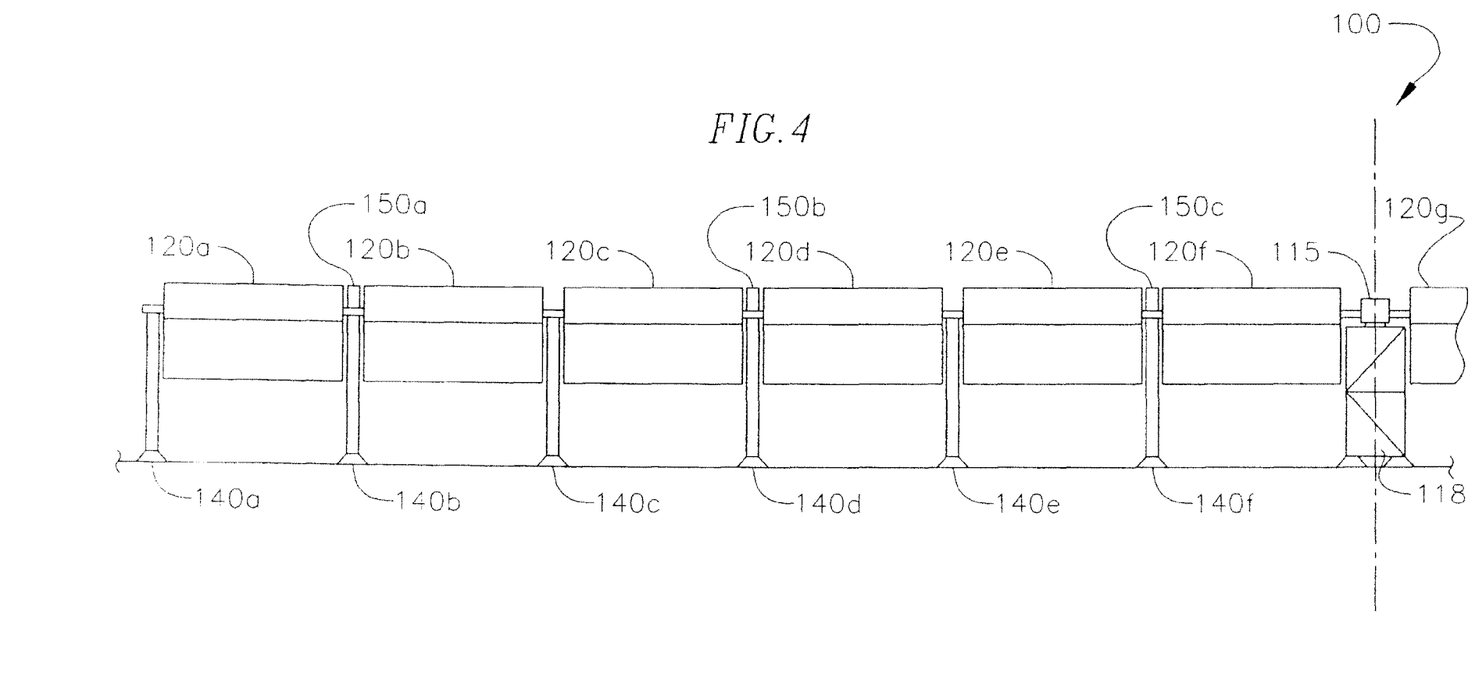
FIG. 4 is a front schematic view of an SCA according to an embodiment of the present invention.

With reference to FIG. 4, an SCA 100 having an MTB system according to an embodiment of the present invention includes troughs 120a, 120b, 120c, 120d, 120e, 120f, 120g that are similar to the troughs 20a, 20b, 20c, 20d, 20e, 20f, and 20g described above with respect to the SCA 10 and shown in FIG. 2, which are in turn supported by supporting pylons 140a, 140b, 140c, 140d, 140e, 140f, and a central pylon 118, which are similar to the supporting pylons 40a, 40b, 40c, 40d, 40e, 40f, and the central pylon 18 described above with respect to the SCA 10. Further, the SCA 100 also includes a center drive mechanism (torque drive mechanism) 115 for providing rotational movement of the troughs 120. The center drive mechanism 115 is similar to the center drive mechanism 15 described above with respect to the SCA 10, but as will be described later herein, the center drive mechanism 115 may be advantageously smaller in size and power requirements than the center drive mechanism 15. Also, for similar reasons, the central pylon 118 may not have to be designed to have the same strength as the central pylon 18.

Figure 5:
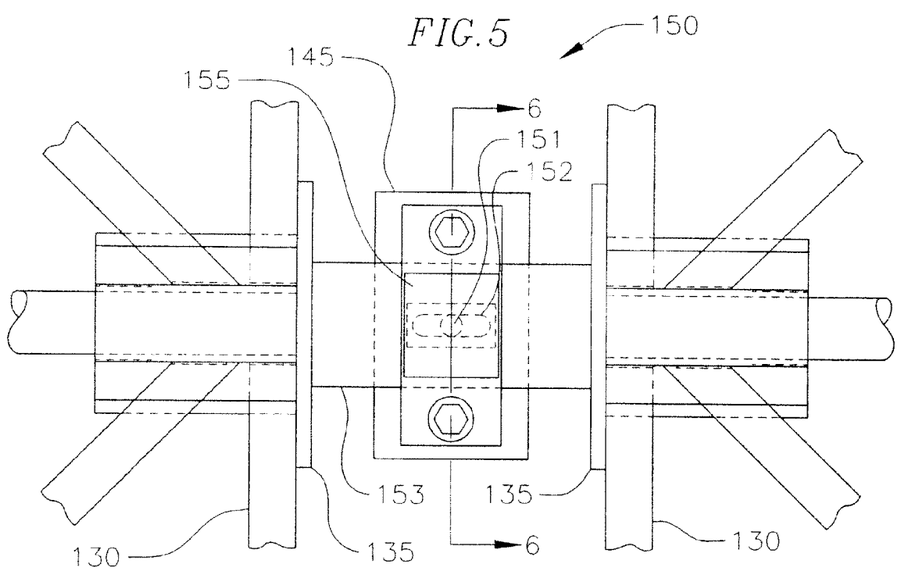
FIG. 5 is a detail top view of a brake of the SCA of FIG. 4.
Figure 6:
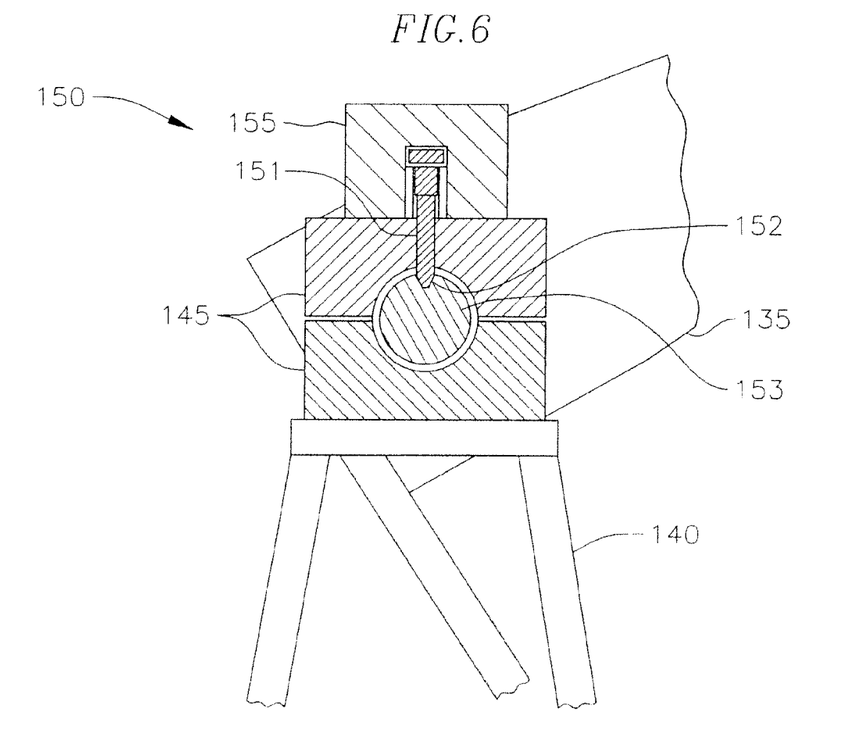
FIG. 6 is a vertical sectional view through the brake of the SCA of FIG. 5 taken at line 6-6.

With reference to FIGS. 5 and 6, the SCA 100 also includes trough frames 130 corresponding to and supporting each of the troughs, similar to the trough frames 30 of the SCA 10. Further, the SCA 100 includes torque plates (torque transfer assemblies) 135 similar to the torque plates 35 of the SCA 10. In one embodiment, there are two torque plates 135 on each of the trough frames 130, one on each side. The trough frames 130 are connected at the torque plates 135, and the torsional loads are transferred from one trough frame 130 to an adjacent trough frame 130 through the connected torque plates 135. The SCA 100 may also include bearings 145 mounted on the pylons 140 and supporting bearing shafts 153 for rotation of the troughs of the SCA 100 about a common axis. The torque plates 135, in one embodiment, are connected to the bearing shafts 153 so that the trough frames 130 and associated troughs are rotatable with the bearing shafts 153.

Embodiments of the MTB system of the present invention replace a single lock-down device at a center drive mechanism, such as the center drive mechanism 15 of the SCA 10, with multiple brakes spaced (e.g., evenly spaced) between the trough frames. As shown in FIG. 4, torque brake mechanisms 150a, 150b, 150c may be placed on supporting pylons 140b, 140d, and 140f. Thus, each of the torque brake mechanisms 150a, 150b, 150c would not be subjected to more torque than the amount generated by two trough frames 130.

For example, in one hypothetical example, wind forces (or other forces) acting on each trough 130 may contribute 100,000 inch-pounds of torque to the system. Individually, each of the outermost troughs 120a, 120b would contribute no more than 100,000 inch-pounds of torque to the torque brake mechanism 150a at supporting pylon 140b, a total of 200,000 inch-pounds. Similar forces applied to the remaining troughs 120c, 120d, 120e, 120f would result in similar torsional loads on the torque brake mechanisms 150b, 150c. Further, no frame would experience more than 100,000 inch-pounds of torque. By contrast, for a system having a single brake at the center drive mechanism 15, such as in the SCA 10, the accumulated torque on each of the innermost troughs 20f, 20g is 600,000 inch-pounds and the torque load for the single brake is 1,200,000 inch-pounds. This represents a vast difference in design loads.

Of course, embodiments of an MTB system according to the present invention are not limited by the number and locations of the torque brake mechanisms 150a, 150b, 150c described above and shown in FIG. 4, as these are illustrative of only one possible configuration. On the contrary, any suitable number of torque brake mechanisms may be utilized and may be installed at any suitable locations along a length of an SCA. For example, a number of torque brake mechanisms utilized and their locations along an SCA may be chosen based on factors such as a number of troughs in a particular SCA, sizes of the troughs, typical wind forces, capacity of the center drive mechanism, or any other factors. Furthermore, the torque brake mechanisms utilized may also be functional as drive units. In one embodiment, for example, one or more of the torque brake mechanisms may be a drive unit in an unpowered state, such that the drive unit functions to constrain rotation of the troughs of the SCA.

Advantages of embodiments of the MTB system may include: (1) trough frame 130 designs that are lighter in weight and therefore less costly to manufacture; (2) torque plates 135 that are lighter in weight and also less costly to manufacture; (3) center drive mechanism 115 designs resulting in weight reductions for the cast housing and shaft, and possibly permitting the use of a less expensive and/or "off-the-shelf" center drive mechanism; (4) a central pylon 118 that is lighter in weight and therefore less costly to manufacture; and (5) reduced twisting of the trough frames 130 and their corresponding reflective surfaces, and the associated loss of focus caused thereby, due to decreased torsional loads at any one trough frame 130.

In the case of the hypothetical torque-loading example described above, the advantages of the MTB system are apparent. Embodiments of the MTB system relieve the center drive mechanism 115 from having to hold the troughs of the SCA 100 stationary against maximum wind-load torque while in the stowed position. For a twelve-trough SCA under the torsional loads of the hypothetical example above, the center drive mechanism 15 of the single-brake SCA 10 would be subjected to a torque of 1,200,000 inch-pounds. However, by utilizing the torque brake mechanisms 150 of the MTB system between every two troughs of the SCA 100, as shown in FIG. 4 and described above, the torsional load on any one torque brake mechanism 150 is only 200,000 inch-pounds, and the center drive mechanism 150 is subjected to a minimal load, if any.

Further, if all of the trough frames are to be built the same, as is desirable for manufacturability and ease of assembly, then in the SCA 10 having a single brake in the center drive mechanism 15, every one of the troughs 20 must be designed and built to withstand the torsional load of 600,000 inch-pounds that will be accumulated and applied to each of the innermost troughs 20f, 20g. However, utilizing the MTB system, as in the SCA 100 of FIG. 4, the torque brake mechanisms 150a, 150b, 150c distribute the torsional loads, and, as a result, every one of the trough frames 130 may be designed and manufactured for withstanding a torsional load of only 200,000 inch-pounds. This results in each of the trough frames 130 being lighter in weight, less expensive to manufacture, and easier to install. Furthermore, the torque required to rotate the SCA 100 is less, and, as a result, the center drive mechanism 115 may be smaller and less expensive, or alternatively, an SCA may include more troughs and, therefore, fewer center drive mechanisms may be required at a facility. In a typical solar-trough solar power generation facility, there are many SCAs and the cost savings generated by utilizing an MTB system according to an embodiment of the present invention will be significant. As one example, there are over 9,000 trough frames at the Nevada Solar One solar-trough solar power generation facility.

The torque brake mechanisms 150 of embodiments of the MTB system may perform the braking function while also allowing for axial movement caused by thermal expansion and contraction. With reference to FIGS. 5 and 6, and as described later herein in more detail, one embodiment of the present design allows the bearing shafts 153 to move axially through the bearings 145 to accommodate thermal expansion and contraction. Further, each of the bearing shafts 153 may include an engagement element, such as a slot 152 (or elongated cavity) formed therein, for receiving an engagement device of the torque brake mechanism 150, such as a pin 151 or a lug, and allowing axial movement of the engagement device of the torque brake mechanism 150 relative to the engagement element of the bearing shaft 153.

Even in the SCA 100 utilizing the MTB system, the innermost troughs 120f, 120g still experience a maximum torsional load due to operating conditions imposed by the wind loading at the threshold plus the friction of the system. Operational torque, like torque seen due to wind while in the stowed ("survival") position, accumulates, frame by frame, toward the center torque drive mechanism 115. It has been shown that the maximum operational torque values are much less than the torque attributable to maximum survival wind speeds for a single-brake system such as the single-brake system of the SCA 10.

Preferably, the maximum torque experienced by any one of the trough frames of the MTB system should be balanced with the maximum operational torque value experienced by the innermost trough 120f by configuring the number and spacing of the torque brake mechanisms 150. For example, assuming that the maximum operational torque experienced by the innermost trough 120f is 150,000 inch-pounds, this exceeds the MTB system torque value of 100,000 inch-pounds as hypothesized previously with the three torque brake mechanisms 150a, 150b, 150c being used on each side of the SCA 100 (a total of six torque brake mechanisms with no braking at the center drive). For example, according to another embodiment, the MTB system may include only three torque brake mechanisms 150, one at each fourth pylon 140c from the central pylon 118 on either side of the SCA 100 and also one at or adjacent the center drive mechanism 115, resulting in a maximum torque value of 400,000 inch-pounds at each torque brake mechanism 150 and a torsional load of 200,000 inch-pounds on any one trough frame. The 200,000 inch-pounds of torsional loading on any one trough frame compares favorably with the 150,000 inch-pounds of maximum operating torque for the innermost troughs 120f, 120g. Thus, different configurations of the MTB system may be desirable for various wind load scenarios and specified maximum operational wind speeds.

The MTB system may incorporate electromechanical hardware and controls. Alternatively, braking may be accomplished through any other reliable or suitable means or devices. With reference to FIGS. 5 and 6, each of the torque brake mechanisms 150 according to one embodiment of the MTB system includes an electrically-activated solenoid 155 that mounts on the bearing block 145 for actively engaging or disengaging a shear pin 151 by inserting the pin 151 through a slotted hole 152, or elongated cavity, in the bearing shaft 153. The slotted hole 152 facilitates pin insertion over a range of movement resulting from thermal expansion and contraction. Though this concept is very simple and easily applied, alternative approaches may be utilized in other embodiments. Embodiments of the MTB system may be configured to use any number of devices to lock down the SCA 100, such as, but not limited to, clamps, lugs, friction pads, and/or swivels that may be mounted to the bearing block 145, the supporting pylon 140, the torque plate 135, or the trough frame 130.

With reference to FIGS. 7-10, in another embodiment, a torque brake mechanism 160 may be engaged in a passive manner when the troughs of the SCA 100 are rotated about a common axis of rotation to a selected stowage position. The common axis of rotation extends along a length of the SCA 100, such as along a centerline of one or more bearing shafts 163 supported by associated shaft bearings 145. In the torque brake mechanism 160, the engagement device is a lug, or elongated bar, 161 receivable in an elongated cavity, or slot, 162. The torque brake mechanism 160 further includes a cam 167 coupled to a bearing shaft 163. The lug 161 is pushed against the cam 167 by a compression spring 164. The spring is compressed as the cam 167 is turned while the bearing shaft 163 and associated trough rotates toward the stowed position (see FIG. 8). When the cam 167 is rotated to an angle corresponding to the stowed position, the cavity 162 aligns with the lug 161, and the compressed spring 164 pushes the lug 161 into the cavity 162 (see FIG. 9).

Figure 7:
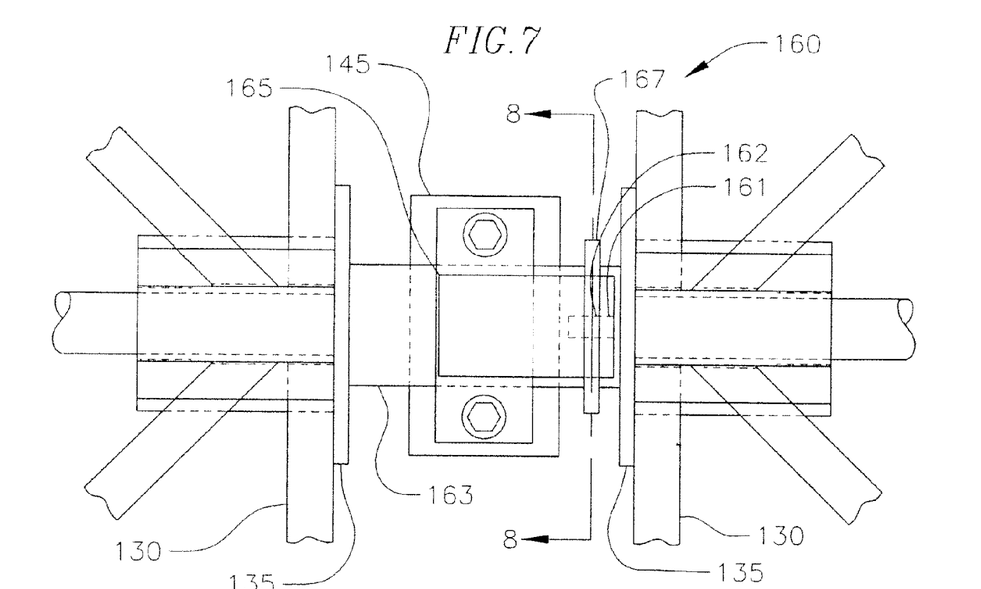
FIG. 7 is a detail top view of a brake of an SCA according to another embodiment of the present invention.
Figure 8:
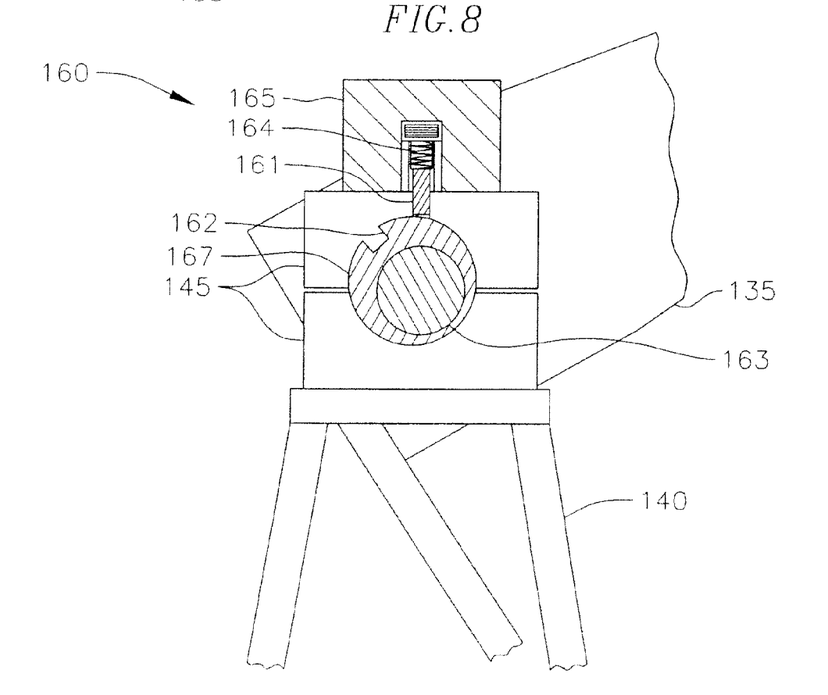
FIG. 8 is a vertical sectional view through the brake of the SCA of FIG. 7 taken at line 8-8, the brake shown in a disengaged position when the SCA is between a collecting position and a stowed position.

In one embodiment, the cam 167 is a stepped or spiraled cam (or a cam having any other suitable shape or feature) configured to not exert any pressure against the engagement device of the torque brake mechanism when the trough frames are in a collecting position. That is, the spring 164 is not compressed while the SCA 100 is collecting solar energy, or "on-sun." The spring 164 will only be compressed after the bearing shaft 163 has rotated to a degree where a step or other feature of the cam 167 causes the spring 164 to be compressed, a degree of rotation corresponding to an "off-sun" position of the troughs of the SCA 100. Such a configuration of the cam 167 prevents undue wear of the components during operation.

Figure 9:
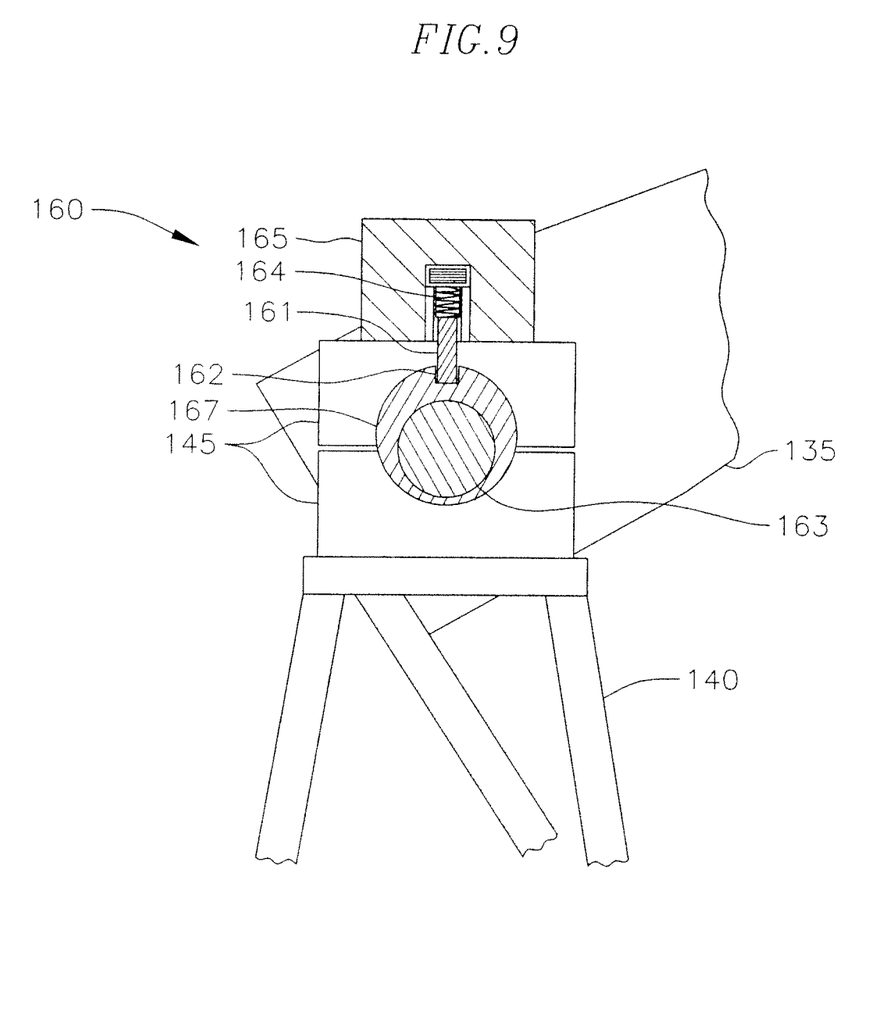
FIG. 9 is a vertical sectional view through the brake of the SCA of FIG. 7, the brake shown in an engaged position when the SCA is in a stowed position.

The force of the compressed spring 164 pushing the lug 161 into and against the bottom of the cavity 162 retains the lug 161 in the cavity 162, thereby maintaining the torque brake mechanism 160 in an engaged state and holding the troughs in the stowed position.

Any other suitable alternative configuration for restraining the bearing shaft 163 and/or the torque plate 135 from rotating may be used, of course, for the engagement device of the torque brake mechanism 160, as well as the engagement element of the bearing shaft 163 or the cam 167 without departing from the spirit or scope of the MTB system of the present invention. Further, as described above with respect to the torque brake mechanism 150, embodiments of the MTB system may be configured to use any number of devices to lock down the SCA 100, such as, but not limited to, clamps, lugs, friction pads, and/or swivels that may be mounted to the bearing block 145, the supporting pylon 140, the torque plate 135, or the trough frame 130.

Figure 10:
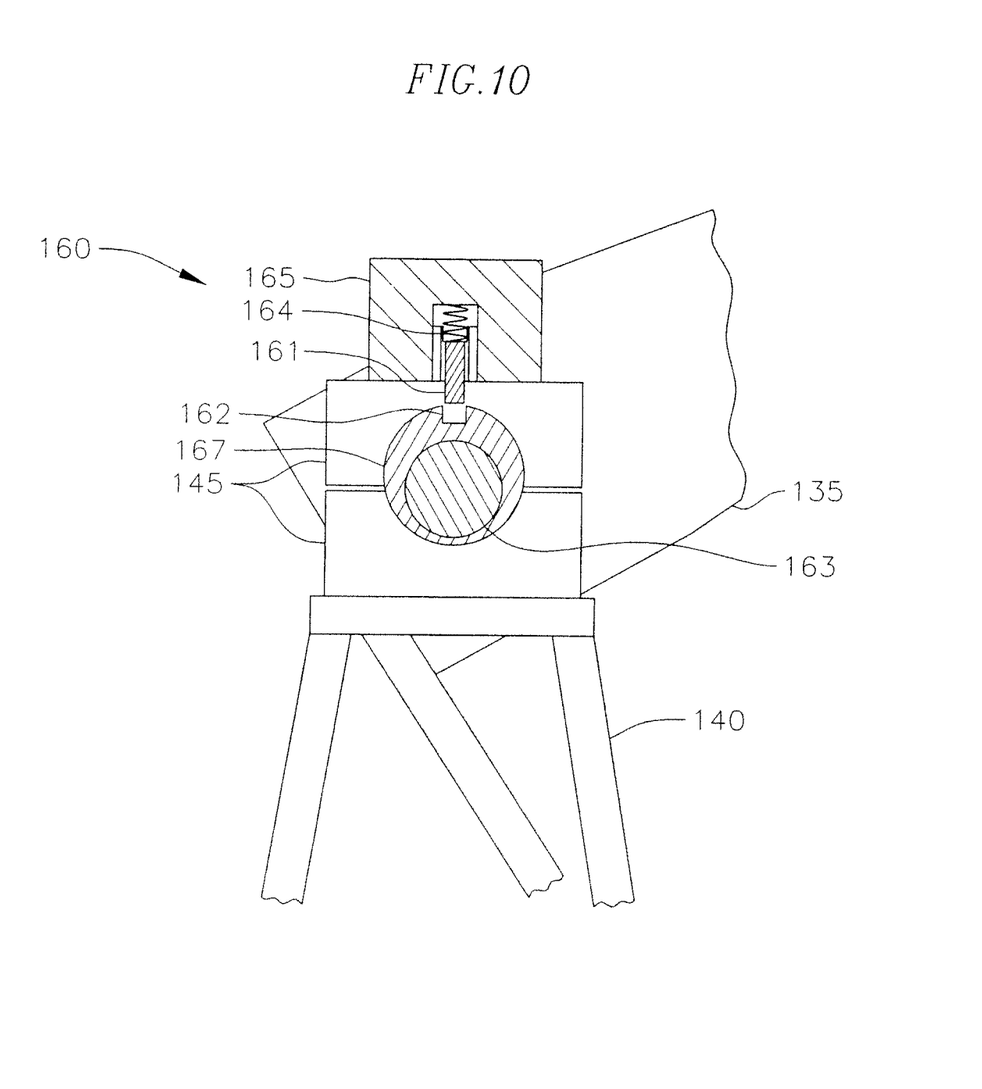
FIG. 10 is a vertical sectional view through the brake of the SCA of FIG. 7, the brake shown in a disengaged position when the SCA is in a stowed position.

As illustrated in FIG. 10, according to one embodiment, the torque brake mechanism 160 may be actively released by energizing the solenoid 165 to withdraw, or disengage, the lug 161 from the cavity 162 of the cam 167. Once the lug 161 is disengaged from the cavity 162 of the cam 167, the bearing shaft 163 and associated troughs may again be rotated about the common axis of rotation.

According to one embodiment of the MTB system, an electrical interlock may be employed to shut down the center drive mechanism 115 when the torque brake mechanisms 150, 160 are engaged.

In one embodiment, all of the torque brake mechanisms 150, 160 may be released concurrently, such as by utilizing an electrical signal from the center drive mechanism 115 or by operator override. For example, when an operator observes that strong winds have subsided, the operator may override the solenoids and place the SCA 100 in operation such that the troughs are "on-sun" for collecting radiant solar energy. This is in contrast to the stowed, "off-sun" position for protecting the troughs and the facility generally during high-wind, or survival, conditions.

Activation of the MTB system would begin when a wind speed exceeded a maximum wind speed prescribed for operating conditions. The SCA 100 may be "on-sun," that is, collecting solar energy and tracking the movement of the sun at wind speeds below an operating wind velocity. As one example, the operating wind velocity may be 35 miles per hour, such that when the wind increases to speeds greater than 35 miles per hour, the center drive mechanism 115 will begin rotating the troughs of the SCA 100 to the stowed ("off-sun") position for protection from the high winds. Of course, the operating wind velocity may be selected to be a value different than 35 miles per hour. The wind speed may be measured utilizing a wind sensor, and the MTB system may be activated by a control system electrically connected to each of the wind sensor and the center drive mechanism 115. Upon receiving a signal from the control system, the center drive mechanism 115 would rotate the SCA 100 into the stowed position, such as depicted in FIG. 3. It is also possible that an operator may choose to move the troughs of the SCA 100 to the stowed position for reasons other than high winds. For example, it may be desired to move the troughs to the stowed position for safety at night or during cloudy periods when little or no solar energy is being collected.

Once the troughs of the SCA 100 reach the stowed position, the MTB system would immediately engage a brake element, such as the pin 151 or the lug 161, of the torque brake mechanisms 150, 160. In one embodiment, engagement of the brake element would be passive. A passive engagement of the brake element does not cause inadvertent engagement of the torque brake mechanism 150, 160 in an SCA 100 that would never rotate as far as the stowed position during operation, that is, when the SCA 100 is "on-sun" and tracking the movement of the sun. A passive engagement element assures that the brakes will retain the troughs in the stowed position in the event of a power outage. Alternatively, each of the torque brake mechanisms 150 may be configured to actively engage the brake element, such as by utilizing a solenoid, hydraulic cylinder, motors, or other devices. The SCA 100 would then be in a "locked down" mode until release of the torque brake mechanisms 150 of the MTB system.

While the torque break mechanisms 150, 160 are engaged, the center drive mechanism 115 may be shut down, utilizing, for example, an over-pressure bypass. This provides a failsafe for the center drive mechanism 115. Also, an inclinometer may be utilized with real-time logic to send an electrical signal to shut down the center drive mechanism 115 when the angular position of the troughs reaches the stowed position.

To reactivate the SCA 100 (e.g., after waiting out the storm) to begin tracking and collecting solar radiant energy, the torque brake mechanisms 150, 160 are released. Each of the torque brake mechanisms 150, 160 may be configured to actively disengage the brake element, such as by utilizing a solenoid, hydraulic cylinder, motors, or other devices. As shown in FIG. 10, the solenoid 165 is energized to pull the lug 161 upward, thereby disengaging the lug 161 from the cavity 162. Once the torque brake mechanisms 150, 160 have been disengaged, the SCA 100 is rotated back to a restart position, and an active restart may be performed at a desired time by an operator.

Additionally, the SCA 100 may be rotated to a maintenance position. The troughs of the SCA 100 are rotated to the maintenance position for cleaning of the reflective surfaces, repair, or other maintenance. The maintenance position is typically located at a degree of rotation about the axis of rotation beyond that of the stowed position (i.e. the reflective surfaces of the troughs are facing downward in the maintenance position). In one embodiment, the solenoids 155, 165 are powered in order to keep the pin 151, lug 161, or other engagement member disengaged from the slot 152 of the bearing shaft 153 or the cavity 162 of the cam 167 as the troughs rotate past the stowage position toward the maintenance position.

Another feature which may be utilized in one embodiment of the MTB system is a device or method for releasing, before rotating the SCA 100 from the stowed position back to the collecting position, any binding which may have occurred between the engagement elements of the torque brake mechanisms 150, 160 while the SCA 100 was maintained in the stowed position. That is, wind forces acting upon the troughs while in the stowed position may cause binding of the pin 151 or lug 161 within the slot 152, 162. A device may be employed, such as in connection with the center drive mechanism 118, to rock the SCA 100 slightly and thereby release any binding between the elements of the torque brake mechanisms 150, 160 before the center drive mechanism 115 rotates the SCA 100 back to the collecting, or "on-sun," position.

In one embodiment of an MTB system, each torque brake mechanism 150 may be located centrally of a set of trough frames 130 in order to distribute wind-related torque loads between the torque brake mechanisms 150. For example, if each set of trough frames 130 consists of a pair of trough frames 130, and a torque brake mechanism 150 is located between the trough frames 130 of the pair, the torque brake mechanism 150 functions to constrain, or lock, each of the pair of trough frames 130 in a stowed angular position to minimize wind forces acting on the trough frames 130. At the same time, the torque brake mechanism 150 performs the function of carrying the torque loads created by the wind loads acting on the trough frames 130 of the pair. Alternatively, rather than a set consisting of a pair of trough frames 130, a set may consist of any other desired number of trough frames 130, along with a suitable number of torque brake mechanisms 150 operated at locations between the trough frames, the quantities and locations selected to provide a desired SCA 100 and a desired MTB system, taking into consideration factors such as system cost, typical wind speeds, size and quantity of the torque brake mechanisms 150, and strength and cost of the trough frames 130.

For example, embodiments of the MTB system of the present invention may include torque brake mechanisms 150 positioned between every two troughs, as shown in FIG. 4, between every three troughs, between every trough, or having any other suitable configuration. Moreover, in some embodiments, the center drive mechanism 115 is located centrally on the SCA, and the torque brake mechanisms 150 are spaced evenly, or symmetrically, on either side of the center drive mechanism 115 and the central pylon 118. However, embodiments of the MTB system of the present invention are not limited to such symmetrical configurations.

Further, while FIG. 4 illustrates an embodiment of the SCA 100 and the associated MTB system having torque brake mechanisms 150a, 150b, 150c operating at locations spaced away from the center drive mechanism 115, in another embodiment, a torque brake mechanism 150 may be located adjacent the center drive mechanism 115. For example, both the center drive mechanism 115 and a torque brake mechanism 150 may be positioned on the central pylon 118. Further, in one embodiment, both the center drive mechanism 115 and the torque brake mechanism 150 may be used to carry the torsional load applied to the innermost troughs 120f, 120g. Alternatively, in another embodiment, only the torque brake mechanism 150 carries the torsional loads of the innermost troughs 120f, 120g, while the center drive mechanism 115 is utilized solely to rotate the troughs of the SCA 100.

Although the drawings and accompanying description illustrate an embodiment of an MTB system as applied to shafts passing through bearings mounted on the pylons, it will be apparent that the novel aspects of the MTB system of the invention may also be carried out by utilizing alternative brake configurations and/or applying the brakes at alternative locations on an SCA. For example, alternatively to, or in addition to, being applied to the bearing shafts, as described above, brakes may be applied directly to the torque plates or any other portion of the trough frames. As a further example of an alternative embodiment, the brakes may be applied at a location other than at the pylons, such as between pylons utilizing a separate footing. Moreover, embodiments of the MTB system according to the present invention may be utilized for other suitable applications, such as for maintaining an assembly of supported photovoltaic panels in a selected angular position.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. In a solar-trough solar power generation facility in which each one of a plurality of curved reflective surfaces is supported by a respective one of a plurality of trough frames connected to one another and rotatable about a common axis of rotation, the trough frames rotatable about the common axis of rotation via a torque drive mechanism, wherein the improvement comprises at least one torque brake mechanism s spaced apart from the torque drive mechanism along the common axis of rotation and operatively associated with at least one of the trough frames, the at least one torque brake mechanism being operable to hold the at least one associated trough frame stationary against torsional loads, and wherein the trough frames are coupled to one another via at least one shaft having an axis of rotation coincident with the common axis of rotation, and each torque brake mechanism is configured to engage a corresponding one of the at least one shaft; the improvement further comprising a tracking controller for activating rotation of the trough frames, the tracking controller configured to activate a center drive mechanism to rotate the trough frame to a stowed position, wherein when in the stowed position, the torque break mechanism of each trough frame is activated to maintain the trough frame in the stowed position.

2. The improvement of claim 1, wherein the trough frames are arranged in sets, and each torque brake mechanism is located centrally of a corresponding one of the trough frame sets.

3. The improvement of claim 2, wherein each trough frame set comprises a pair of adjacent trough frames.

4. The improvement of claim 1, wherein each torque brake mechanism is operable when the trough frames have a selected angular position relative to the common axis of rotation.

5. The improvement of claim 4, wherein the selected angular position of the trough frames defines a position of the trough frames that is protective of the facility.

6. The improvement of claim 4, wherein the trough frames are coupled to and supported by supporting pylons and connected to one another via torque transfer assemblies.

7. The improvement of claim 6, wherein each torque brake mechanism comprises an engagement device configured to passively engage an engagement element of the corresponding shaft when the trough frames are rotated to the selected angular position.

8. The improvement of claim 7, wherein the engagement device of the torque brake mechanism comprises a pin or a lug.

9. The improvement of claim 7, wherein the engagement element of the shaft comprises an elongated cavity having a cross-sectional shape substantially corresponding to a cross-sectional shape of the engagement device of the torque brake mechanism to prevent or substantially prevent rotation of the shaft when the engagement element of the shaft receives the engagement device of the torque brake mechanism, the elongated cavity allowing for axial movement of the engagement device of the torque brake mechanism relative to the engagement element of the shaft.

10. The improvement of claim 7, wherein the engagement device of the torque brake mechanism is spring-loaded.

11. The improvement of claim 7, wherein the shaft comprises a cam, and the engagement element of the shaft is on an outer surface of the cam.

12. The improvement of claim 11, wherein the cam is a stepped or spiraled cam configured to not exert any pressure against the engagement device of the torque brake mechanism when the trough frames are in a collecting position.

13. The improvement of claim 7, wherein each torque brake mechanism further comprises a disengagement device for actively disengaging the engagement device of the torque brake mechanism from the engagement element of the shaft.

14. The improvement of claim 13, wherein the disengagement device of the torque brake mechanism comprises a solenoid.

15. The improvement of claim 13, wherein the at least one torque brake mechanism comprises a plurality of torque brake mechanisms configured to disengage at the same time in response to an electrical signal.

16. The improvement of claim 6, wherein each torque brake mechanism is operatively associated with at least one of the torque transfer assemblies at a location corresponding to one of the supporting pylons.

17. The improvement of claim 1, wherein each torque brake mechanism is electrically coupled to the torque drive mechanism.

18. The improvement of claim 1, wherein each one of the plurality of curved reflective surfaces is a cylindrically curved reflective surface.

19. The improvement of claim 1, wherein each torque brake mechanism is operatively associated with the at least one of the trough frames at a location separate from a location of the torque drive mechanism.

20. The improvement of claim 1, wherein the at least one torque brake mechanism comprises a plurality of torque brake mechanisms located and configured to reduce the torsional loads applied to the trough frames while in a stowed angular position to a level less than a greatest torsional load applied at the torque drive mechanism while the trough frames are in a collecting position.

21. A multiplexed torque brake system for a solar concentrator assembly having a plurality of solar reflector frames spaced along a length of the solar concentrator assembly and rotatable about a common axis of rotation via a drive mechanism, the system comprising a plurality of brake mechanisms arranged at locations spaced apart from the drive mechanism and from each other along the length of the solar concentrator assembly, each of the brake mechanisms coupled to a corresponding one of a plurality of supporting pylons and configured to constrain the solar reflector frames from rotating when subjected to torsional loads, the brake mechanisms adapted to transfer the torsional loads to the corresponding supporting pylons, wherein the solar reflector frames are coupled to one another via at least one shaft having an axis of rotation coincident with the common axis of rotation, and each brake mechanism is configured to engage a corresponding one of the at least one shaft; further comprising a tracking controller for activating rotation of the trough frames, the tracking controller configured to activate a center drive mechanism to rotate the trough frame to a stowed position, wherein when in the stowed position, the torque break mechanism of each trough frame is activated to maintain the trough frame in the stowed position.

22. A method of maintaining a solar concentrator assembly in a stowed position utilizing a plurality of torque brakes, the method comprising: positioning the torque brakes at selected locations spaced apart from a drive mechanism along a length of the solar concentrator assembly, the locations being selected to minimize a maximum torsional load applied to any one of a plurality of trough frames of the solar concentrator assembly that are coupled to one another via at least one shaft having an axis of rotation coincident with a common axis of rotation of the trough frames; activating a tracking controller for activating rotation of the trough frames, the tracking controller configured to activate a center drive mechanism to rotate the trough frame to a stowed position, rotating the trough flames about the common axis of rotation via the drive mechanism from a collecting position to the stowed position in response to a stowage condition, the common axis of rotation extending along the length of the solar concentrator assembly; engaging the torque brakes with at least one corresponding one of the at least one shaft after the trough frames have been rotated to the stowed position to constrain the trough frames from rotating about the common axis of rotation; and disengaging the torque brakes in response to a disengagement condition to allow the trough frames to rotate about the common axis of rotation.

23. The method of claim 22, wherein the stowage condition is a measured wind velocity being greater than a predetermined stowage wind velocity.

24. The method of claim 22, wherein the engaging the torque brakes is performed in a passive manner when the trough frames are rotated to the stowed position, and the disengaging the torque brakes is performed in an active manner.

25. The improvement of claim 1, wherein the at least one torque brake mechanism is operable to reduce a torque experienced by the at least one associated trough frame due to the torsional loads in order to reduce a design weight of the at least one associated trough frame.

26. The improvement of claim 1, wherein the at least one torque brake mechanism comprises a plurality of torque brake mechanisms, and at least one torque brake mechanism of the plurality of torque brake mechanisms is operatively associated with the at least one of the trough frames at a location of the torque drive mechanism.

27. The improvement of claim 2, wherein the at least one torque brake mechanism is operable to reduce an accumulation of torque experienced along the corresponding trough frame set.

28. The improvement of claim 6, wherein the at least one torque brake mechanism comprises a plurality of torque brake mechanisms, each of the plurality of torque brake mechanisms being operatively associated with a pair of adjacent trough frames at a location corresponding to one of the supporting pylons, and wherein torque brake mechanisms of the plurality of torque brake mechanisms are spaced apart from one another at locations corresponding to every other supporting pylon.

29. The improvement of claim 7, wherein the at least one torque brake mechanism is configured to maintain the engagement device disengaged from the engagement element of the shaft when the trough frame is in the selected angular position for rotating the trough frame past the selected angular position to another angular position.

* * * * *